(12) United States Patent
Mo

(10) Patent No.: US 12,504,336 B2
(45) Date of Patent: Dec. 23, 2025

(54) BOX-PACKED EAR THERMOMETER PROBE COVER CAPABLE OF PREVENTING CONTACT INFECTION

(71) Applicant: Jiaxuan Mo, Shenzhen (CN)

(72) Inventor: Jiaxuan Mo, Shenzhen (CN)

( * ) Notice: Subject to any disclaimer, the term of this patent is extended or adjusted under 35 U.S.C. 154(b) by 406 days.

(21) Appl. No.: 18/201,206

(22) Filed: May 24, 2023

(65) Prior Publication Data
US 2024/0393189 A1    Nov. 28, 2024

(51) Int. Cl.
*G01K 13/25*  (2021.01)
*G01J 5/02*   (2022.01)
*G01J 5/04*   (2006.01)

(52) U.S. Cl.
CPC ............ *G01K 13/252* (2021.01); *G01J 5/021* (2013.01); *G01J 5/049* (2013.01)

(58) Field of Classification Search
CPC ....... G01K 13/252; G01K 13/25; G01J 5/021; G01J 5/049; G01J 5/02; G01J 5/04
See application file for complete search history.

(56) References Cited

U.S. PATENT DOCUMENTS

| | | | |
|---|---|---|---|
| 2010/0147720 A1* | 6/2010 | Li | G01J 5/02 600/184 |
| 2014/0117039 A1* | 5/2014 | Lin | A61B 50/20 221/186 |
| 2018/0098703 A1* | 4/2018 | Lin | A61B 5/6817 |

* cited by examiner

*Primary Examiner* — Alexander A Mercado
*Assistant Examiner* — Julia Fitzpatrick
(74) *Attorney, Agent, or Firm* — Jose Cherson Weissbrot

(57) ABSTRACT

A box-packed ear thermometer probe cover capable of preventing contact infection comprises a packing box, a plurality of stacked ear thermometer probe covers, and a cover holder, wherein an opening which can be opened and closed is formed in the top of the packing box, a long slot is formed in a side face of the packing box, ear thermometer probe covers are placed in the packing box, each ear thermometer probe cover comprises a container structure and a container space, a cover holder is disposed below the lowest ear thermometer probe cover and comprises a sealing wall, a top surface and a suspension structure suspended on the top surface, the ear thermometer probe covers are supported by the cover holder, and the sealing wall extends upwards to the opening and seals the long slot.

19 Claims, 8 Drawing Sheets

BOX-PACKED EAR THERMOMETER PROBE COVER CAPABLE OF PREVENTING CONTACT INFECTION

BACKGROUND

1. Technical Field

The invention relates to the technical field of ear thermometer probe covers, in particular to a box-packed ear thermometer probe cover capable of preventing contact infection.

2. Description of Related Art

Ear thermometers obtain the body temperature by detecting an infrared spectrum emitted by the tympanic membrane of human ears, and are widely used in daily life. To prevent cross infection of ear thermometers in use, the ear thermometers in the prior art are used together with disposable covers.

In the prior art, ear thermometer probe covers are often placed in a box, and are taken out by users when used; however, by adopting this solution, the ear thermometer probe covers may be polluted by the fingers of users when taken out of the box, increasing the risk of cross infection. In the prior art, an opening is formed in the side face of the box, and the ear thermometer probe covers are pushed out of the box through the opening; however, when the ear thermometer probe covers are pushed out through the opening, the edges of the covers may still be polluted by the fingers of users, and dust may fall onto the ear thermometer probe covers through the opening formed in the side face of the box.

To protect ear thermometer probe covers against pollution, U.S. Pat. No. 20100147720 discloses a dispersing container for ear thermometer probe covers and a manufacturing method thereof, wherein the dispersing container for ear thermometer probe covers comprises a hollow shell and a supporter, the hollow shell has one end formed with a first opening and the other end opposite to the first opening formed with a second opening, open ends of ear thermometer probe covers are posed to face the first opening of the hollow shell, and at least one pair of tab portions are disposed in the hollow shell close to the second opening; one end of the supporter is received in the hollow shell, the other end of the supporter stretches out from the second opening of the hollow shell, the supporter has a third opening facing the first opening to accommodate hollow bodies of the ear thermometer probe covers, at least one pair of second tab portions are disposed on an outer side of the supporter close to the third opening and abut against the pair of first tab portions to prevent the supporter from stretching out from the second opening.

By adopting this solution, ear thermometer probe covers can be effectively protected against pollution and can be pushed out of the dispensing container by means of the supporter; however, the ejecting mechanism in this solution ejects the ear thermometer probe covers and locates the supporter with respect to the hollow shell by means of frictional interference between the outer wall of the supporter and the inner wall of the hollow shell, the frictional force between the outer wall of the supporter and the inner wall of the hollow shell will be reduced after long-term use and repeated friction, at this moment, the position of the supporter with respect to the hollow shell cannot be effectively fixed anymore by means of the frictional force, and all remaining ear thermometer probe covers will be pushed out of the dispensing container by the supporter when the frictional force is not active, so the ear thermometer probe covers will be polluted, and the service life of the dispensing container will be greatly shortened. In addition, multiple limiting structures are disposed in either the supporter or the hollow shell, which greatly increases the manufacturing cost of the dispensing container and limits the proportion of the dispensing container.

In view of the above problems, it is necessary to provide a novel ear thermometer probe cover, which can be effectively prevented from being polluted when a temperature measurement probe of an ear thermometer probe is placed therein, can also be protected against dust pollution when not used, and is simple in structure, easy to operate, long in service life and low in manufacturing cost.

BRIEF SUMMARY

A box-packed ear thermometer probe cover capable of preventing contact infection comprises a packing box, a plurality of stacked ear thermometer probe covers, and a cover holder, wherein the packing box comprises a base, a vertical structure, a cavity and a cap, the vertical structure has an inner wall defining the cavity and an inner edge defining an opening of the cavity, the cap seals the opening, and a long slot is formed in the vertical structure; each of the plurality of ear thermometer probe covers comprises an upper platform and a container structure, wherein the container structure is suspended on the upper platform, and has an inner surface defining a container space and an inner circumferential edge defining an opening of the container space; the container structures of the ear thermometer probe covers located above stretch into the container spaces of the ear thermometer probe covers located below, such that the plurality of ear thermometer probe covers are stacked;

The cover holder comprises a sealing wall, a top surface and a suspension structure suspended on the top surface, wherein the top surface has an upper surface and an opening, the suspension structure has an inner border defining the size of the opening, and a suspension space, the sealing wall is connected to the top surface and extends in a direction opposite to the suspension structure, and when the cover holder is disposed in the cavity, the sealing wall seals the long slot.

BRIEF DESCRIPTION OF THE SEVERAL VIEWS OF THE DRAWINGS

To more clearly explain the technical solutions of the application, drawings used in embodiments of the application will be briefly introduced below. Obviously, the drawings in the following description merely illustrate some embodiments of the invention, and those ordinarily skilled in the art can obtain other drawings according to the following ones without creative labor.

In the figures.

1, packing box; 11, base; 12, vertical structure; 13, cavity; 14, cap; 16, inner edge; 17, opening; 18, long slot;

2, ear thermometer probe cover; 21, upper platform; 22, container structure; 23, container space; 24, inner surface; 25, inner circumferential edge; 26, opening; 28, upper surface; 29, lower surface; 281, annular protrusion;

3, cover holder; 31, sealing wall; 32, top surface; 33, suspension structure; 34, upper surface; 35, opening; 36, inner border; 37, suspension space; 38, anti-slip line.

DETAILED DESCRIPTION

The technical solutions of the embodiments of the application will be clearly and completely described below in conjunction with the drawings of these embodiments. Obviously, the embodiments in the following description are merely illustrative ones, and are not all possible ones of the application. All other embodiments obtained by those ordinarily skilled in the art according to the following ones without creative labor should fall within the protection scope of the invention.

The term "embodiment" or "implementation" mentioned in this specification means that a specific feature, structure or characteristic described in the "embodiment" or "implementation" is included in at least one embodiment of the application. The term "embodiment" or "implementation" in different positions of this specification does not definitely refer to the same embodiment, or an independent or alternative embodiment mutually exclusive with other embodiments. Those skilled in the art can explicitly or implicitly understand that the embodiments described in this specification can be combined with other embodiments.

For the sake of convenience, terms indicating directional or positional relations such as "middle", "upper", "lower", "front", "back", "vertical", "horizontal", "top", "bottom", "inner" and "outer" in this specification are used to explains the positional relation between elements with reference to the accompanying drawings merely for the purpose of facilitating and simplifying the description of the invention, and do not indicate or imply that a device or element referred to must be in a specific direction, or configured and operated in a specific direction, and thus, they should not be construed as limitations of the disclosure. The positional relations between the elements change properly according to the direction of the elements. Thus, the positional relations between the elements are not limited to the explanatory terms in this specification, and can change properly as the case may be.

Figure 1:
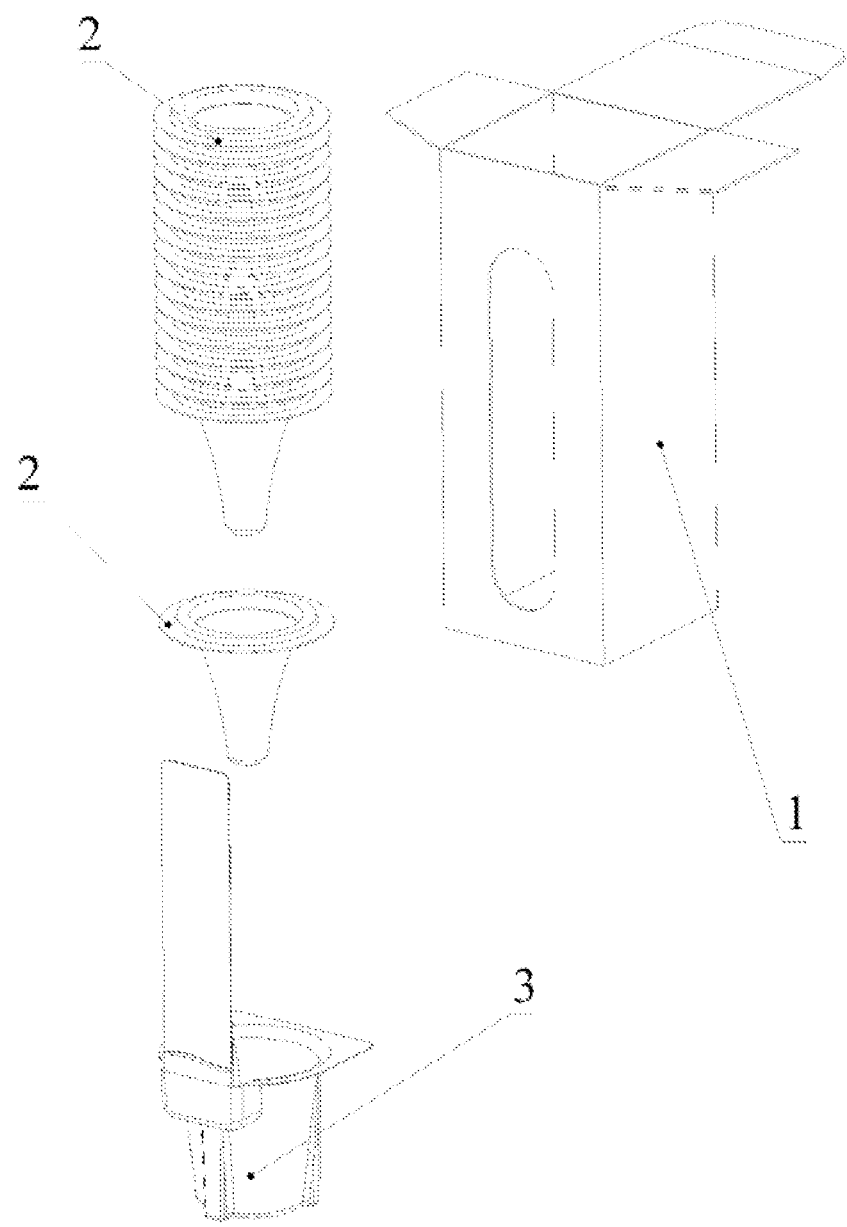
FIG. 1 is a schematic diagram of the invention.

As shown in FIG. 1, the invention provides a box-packed ear thermometer probe cover capable of preventing contact infection, which comprises a packing box 1, a plurality of stacked thermometer probe covers 2, and a cover holder 3, wherein the packing box 1 provides a closed environment for the plurality of stacked thermometer probe covers 2 to protect the ear thermometer probe covers 2 against pollution, and the ear thermometer probe covers 2 can be pushed out of the packing box 1 to be used by users through the cover holder 3 without being polluted.

Figure 2:
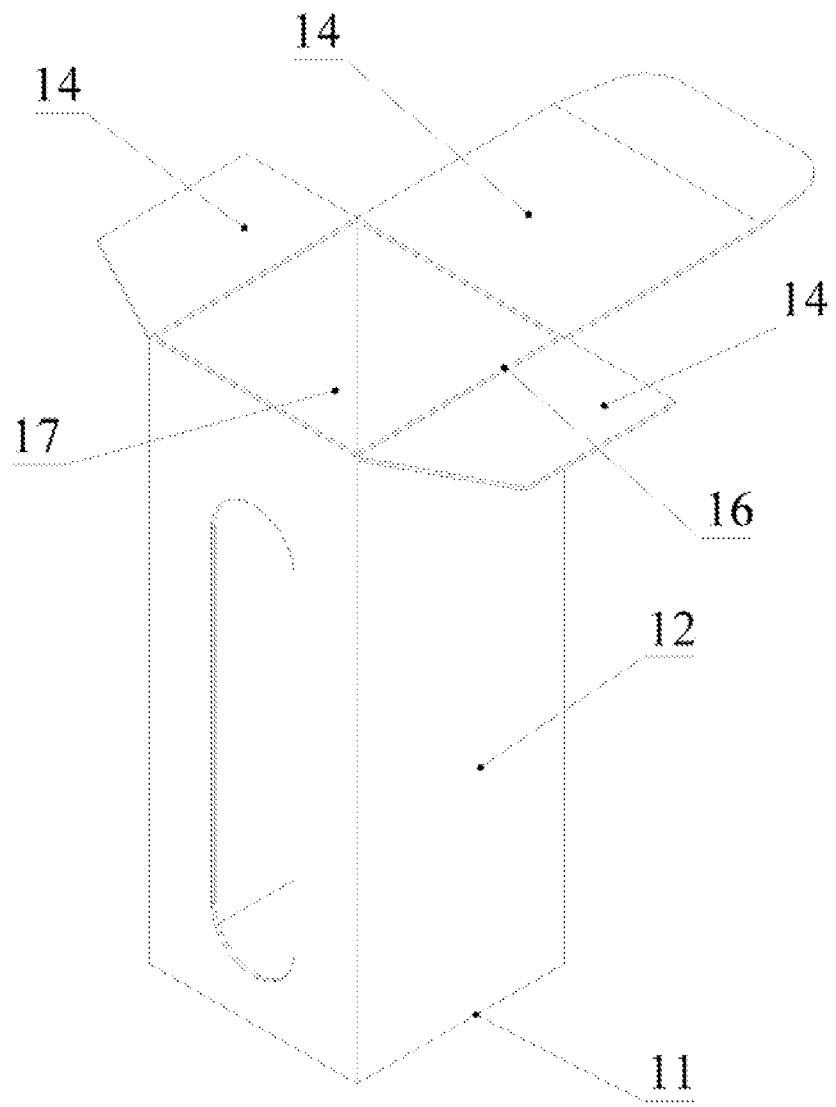
FIG. 2 is a schematic diagram of a packing box.
Figure 3:
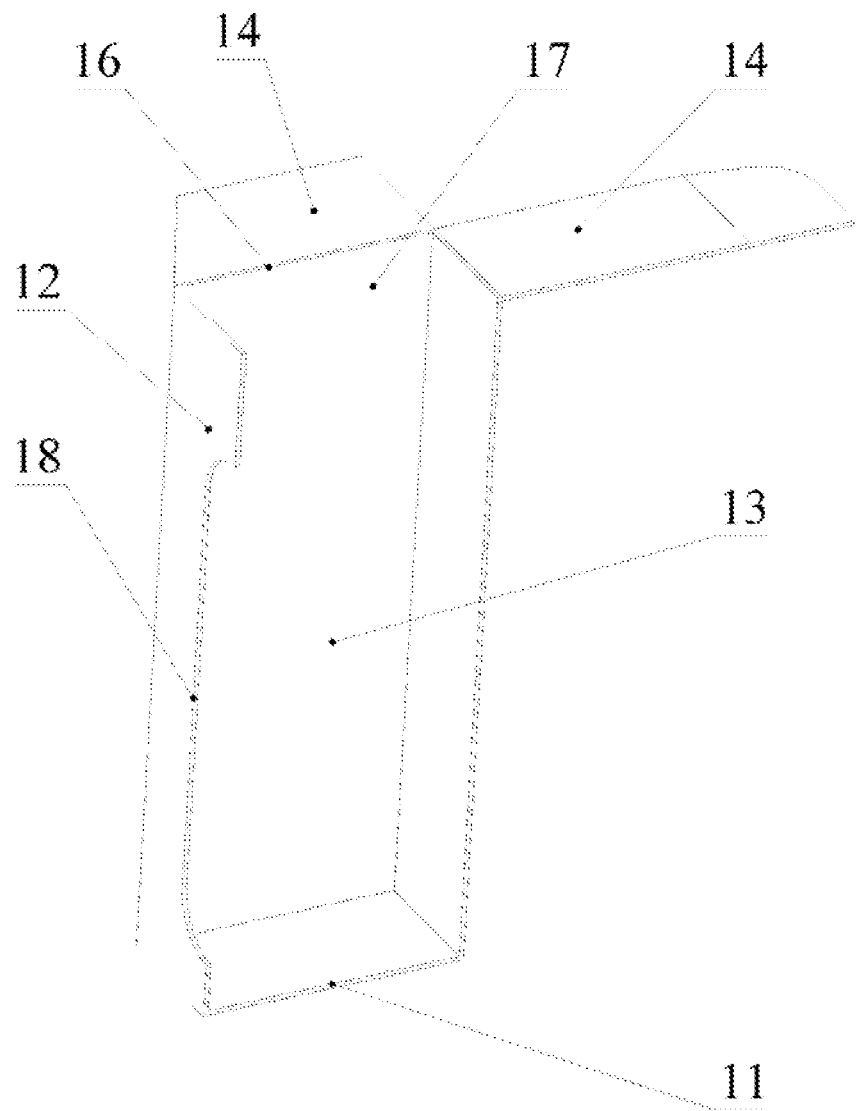
FIG. 3 is a sectional view of the packing box.

As a preferred embodiment of the invention, as shown in FIG. 2 and FIG. 3, the packing box 1 comprises a base 11, a vertical structure 12, a cavity 13 and a cap 14, wherein the vertical structure 12 has an inner wall defining the cavity 13 and an inner edge 16 defining an opening 17 of the cavity 13, the cap 14 seals the opening 17, and a long slot 18 is formed in the vertical structure 12.

In this embodiment, the vertical structure 12 extends upwards from the base 11 and defines the cavity 13 along the outer contour of the base 11, and the opening 17 is formed in the top of the cavity 13 and defines a unique channel allowing the ear thermometer probe covers 2 to enter the cavity 13. As a preferred embodiment of the invention, the base 11 is preferably configured to be rectangular, and the vertical structure 12 has a cross section in the same shape as the base 11. In some embodiments, the shape of the base 11 can be changed according to actual use requirements of users, and the shape of the cross section of the vertical structure 12 can be changed accordingly. For example, the base 11 may be configured to be circular, and correspondingly, the cross section of the vertical structure 12 is also circular, such that the vertical structure 12 can be held by users more comfortably. In some other embodiments, the base 11 may be in any desired shape, and the cross section of the vertical structure 12 may be in any desired shape.

In the invention, the opening 17 defines the unique channel allowing the ear thermometer probe covers 2 to enter the cavity 13, and not only can the ear thermometer probe covers 2 enter the cavity 13 through the channel, but also dust or other pollutants in the air can enter the cavity 13 through the channel and pollute the ear thermometer probe covers 2, so it is necessary to seal the opening 17.

In this embodiment, as shown in FIG. 2 and FIG. 3, the cap 14 is configured to seal or open the opening 17 to open or close the channel through which other substances enter the cavity 13. In this embodiment, the cap 14 is connected with the inner edge 16. Specifically, the cap 14 and the vertical structure are formed integrally, and the inner edge 16 pivotally seals or opens the opening 17. In some embodiments, to further reduce pollution to the packing box 1, the cap 14 is configured to detachably open or close the opening 17. Specifically, the cap 14 is an independent part, and is detachably fixed and connected to the opening 17 through threads, buckles or magnetic attraction, or in other manners, to open or close the channel through which other substances enter the cavity 13 through the opening 17.

To prevent cross infection when an ear thermometer is used, the ear thermometer is often used together with a disposable cover, and the structure of the disposable cover is also a key factor for pollution prevention when the disposable cover is stored.

Figure 4:
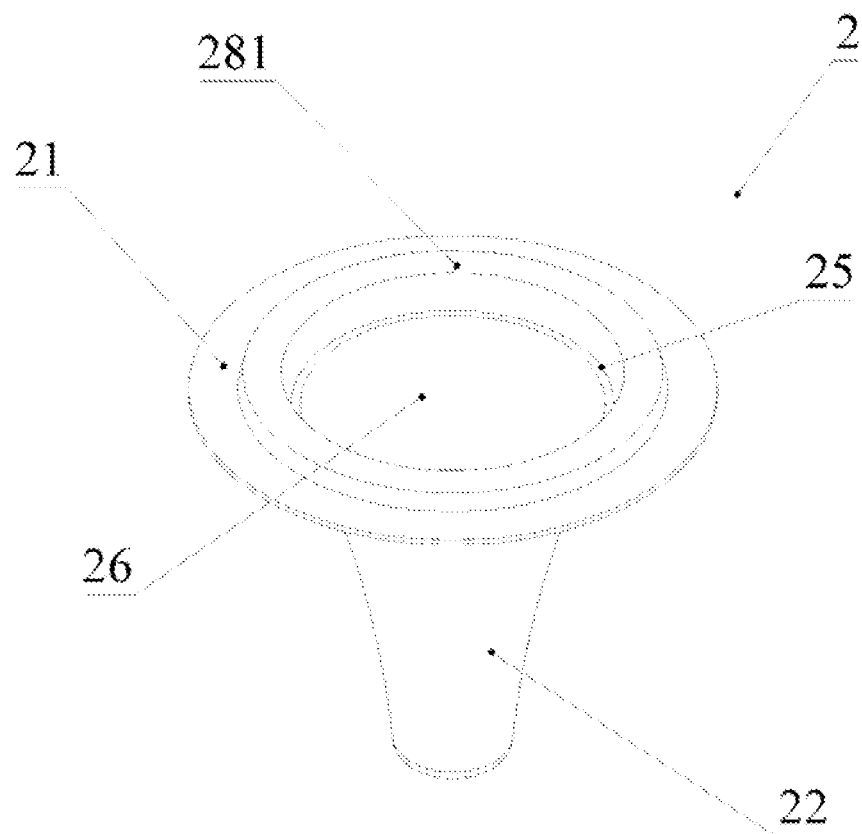
FIG. 4 is a schematic diagram of an ear thermometer probe cover.
Figure 5:
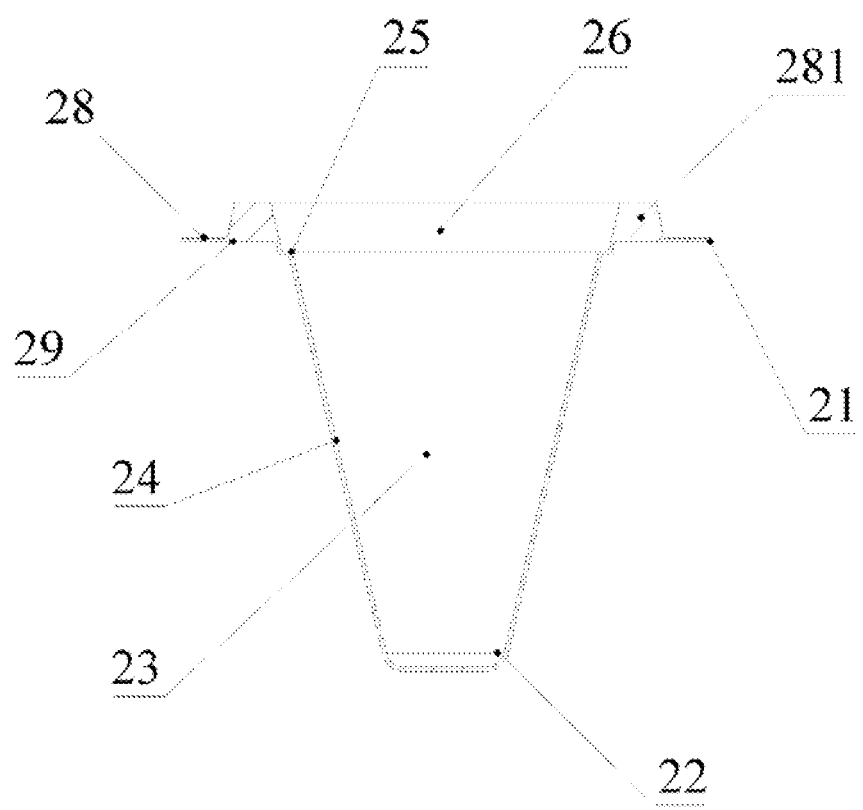
FIG. 5 is a sectional view of the ear thermometer probe cover.
Figure 6:
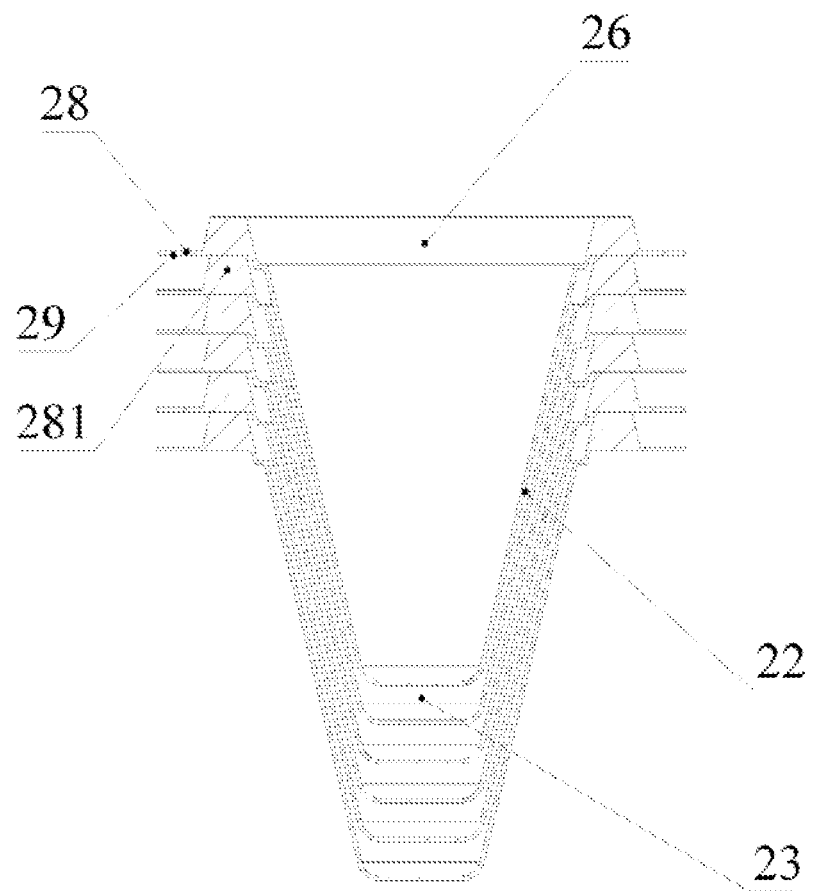
FIG. 6 is a sectional view of stacked ear thermometer probe covers according to the invention.

As a preferred embodiment of the invention, as shown in FIG. 4, FIG. 5 and FIG. 6, each of the ear thermometer probe covers 2 comprises an upper platform 21 and a container structure 22, wherein the container structure 22 is suspended on the upper platform 21, and has an inner surface 24 defining a container space 23 and an inner circumferential edge 25 defining an opening 26 of the container space 23. The container structures 22 of the ear thermometer probe covers 2 located above stretch into the container spaces 23 of the ear thermometer probe covers 2 located below, such that the plurality of ear thermometer probe covers 2 are stacked.

In this embodiment, the container structure 22 is configured to accommodate a temperature measurement probe of an ear thermometer, and the ear thermometer probe covers 2 are placed in the cavity 13 of the packing box 1; to make the packing box 1 accommodate more ear thermometer probe covers 2 to reduce the manufacturing cost and the waste of resources, the ear thermometer probe covers 2 are configured to be stacked in the cavity 13, such that more ear thermometer probe covers 2 can be accommodated in the limited accommodating space of the cavity 13. Specifically, the container structures 22 of the ear thermometer probe covers 2 located above stretch into the container spaces 23 of the ear thermometer probe covers 2 located below, such that the container space 23 can be fully used.

To further reduce pollution to the stacked ear thermometer probe covers 2, as shown in FIG. 5 and FIG. 6, the upper platform 21 of the ear thermometer probe cover 2 further comprises an upper surface 28 and a lower surface 29, wherein an annular protrusion 281 is disposed on the upper surface 28, and the horizontal width of the container structure 22 decreases gradually in a direction away from the upper platform 21. As a preferred embodiment of the invention, the lower surface 29 of each of the plurality of ear thermometer probe covers 2 is in contact with the annular protrusion 281 of another one of the plurality of ear thermometer probe covers 2.

In this embodiment, the annular protrusion 281 has a height that is elevated with respect to the upper platform 21 in the vertical direction. By means of the height, a safety space can be formed between the container structure 22 and the inner surface 24 of the container space 23 where the container structure 22 stretches when the annular protrusion 281 is in contact with the lower surface 29, and the safety space can effectively prevent pollution caused by contact between the inner surface 21 of the container space 23 and an outer wall of the container structure when the ear thermometer probe covers 2 are stacked. In some embodiments, the annular protrusion 281 may have different heights to change the size of the safety space. In some embodiments, the annular protrusion may be in different shapes, for example, the protrusion may be a protruding point, a lug, or any other protrusions in desired shapes. In this embodiment, the container structure 22 is configured to be conical. In some embodiments, the container structure 222 may be in other shapes, for example, the container structure 222 may be trapezoidal or in other shapes with the horizontal width decreasing gradually in the vertical direction.

In the invention, the long slot 18 is designed to allow the fingers of users to stretch therein to push out the ear thermometer probe covers 2 for use. To prevent the ear thermometer probe covers 2 from being polluted when pushed out by users, the cover holder 3 is provided to protect the ear thermometer probe covers 2 against pollution when the ear thermometer probe covers 2 are pushed out.

Figure 7:
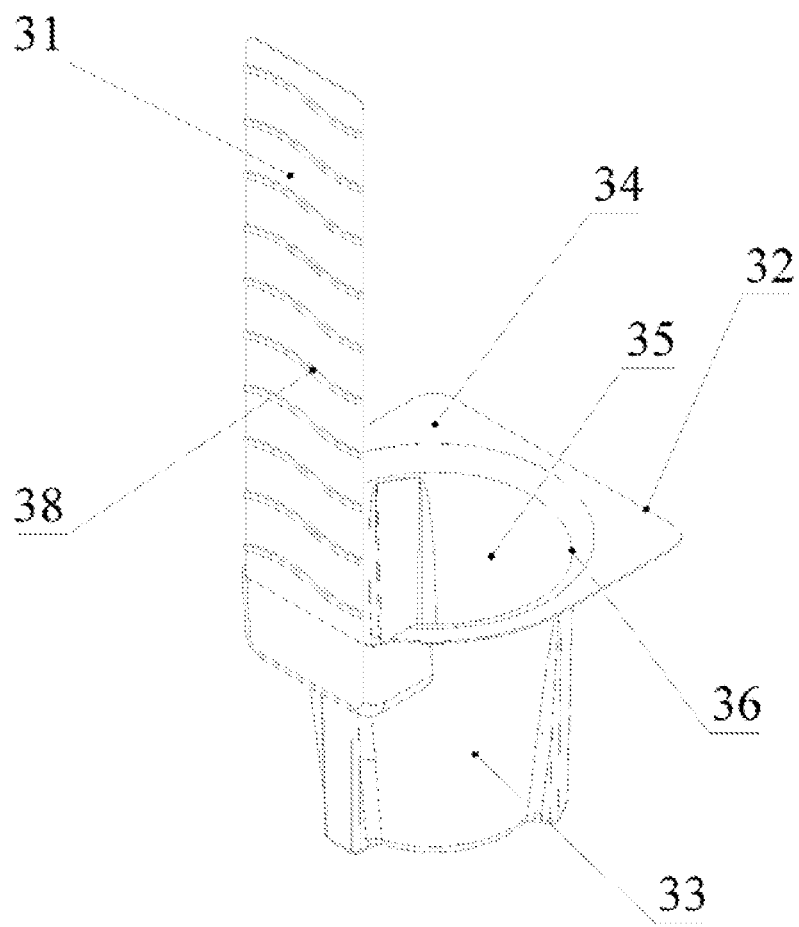
FIG. 7 is a schematic diagram of a cover holder.
Figure 8:
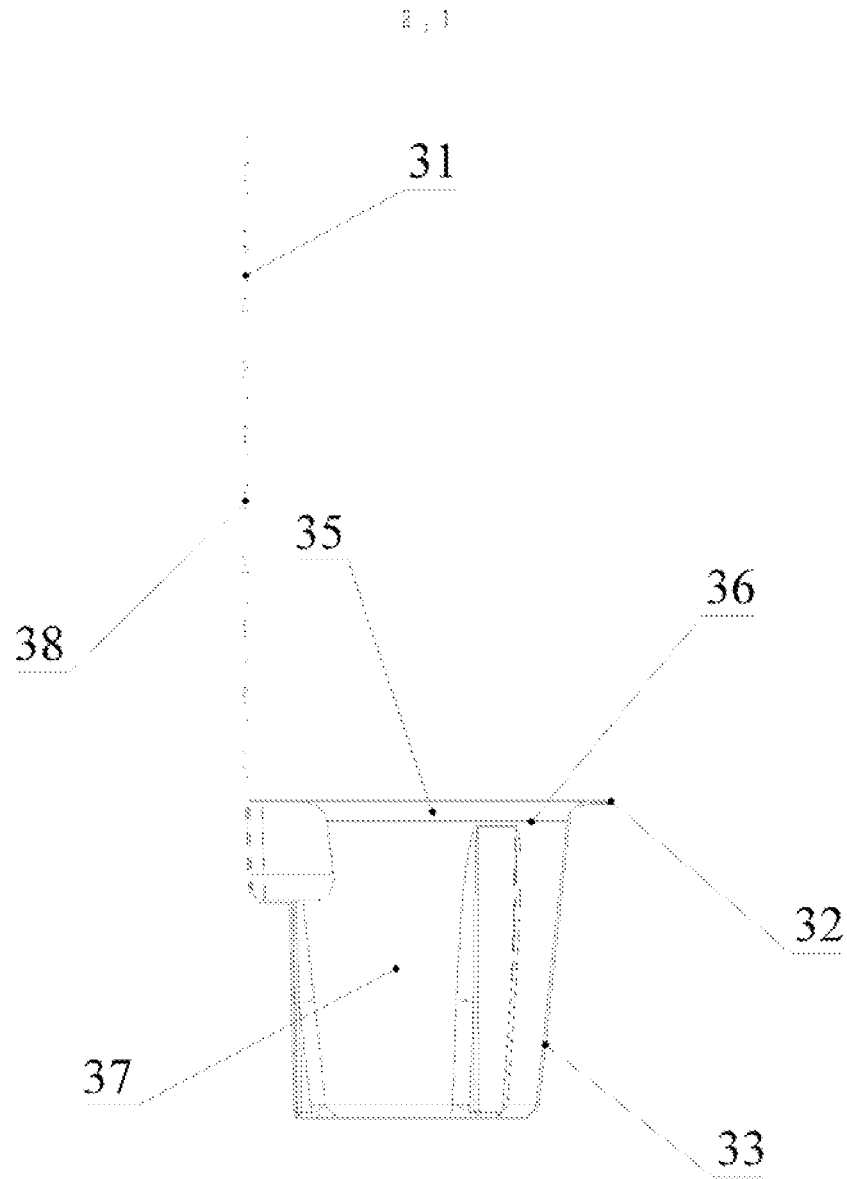
FIG. 8 is a sectional view of the cover holder.

Specifically, as shown in FIG. 7 and FIG. 8, the cover holder 3 comprises a sealing wall 31, a top surface 32, and a suspension structure 33 suspended on the top surface 32, wherein the top surface 32 has an upper surface 34 and an opening 35, the suspension structure 33 has an inner border 36 defining the size of the opening 35, and a suspension space 37, the sealing wall 31 is connected to the top surface 32 and extends in a direction opposite to the suspension structure 33, and when the cover holder 3 is disposed in the cavity 13, the sealing wall 31 seals the long slot 18.

As a preferred embodiment of the invention, the container structure 22 of the lowest one of the plurality of stacked ear thermometer probe covers 2 stretches into the suspension space 37.

In this embodiment, the lower surface 29 of the lowest one of the plurality of stacked ear thermometer probe covers 2 is in contact with the upper surface 34 of the cover holder 3, and the inner border 36 of the opening 35 of the suspension structure 33 is configured to be greater than the horizontal width of the container structure 22, and the depth of the suspension space 37 is configured to be greater than the vertical height of the container structure 22, such that when the container structure 22 stretches into the suspension space 37 a safety space is formed between the container structure 22 and the inner surface of the suspension space 37, and the safety space can protect the ear thermometer probe covers 2 against pollution caused by contact.

To further prevent the ear thermometer probe covers 2 against pollution when the ear thermometer probe covers 2 are used or not used, the width of the sealing wall 31 is configured to be greater than that of the long slot 18, and the length of the sealing wall 31 is configured to be greater than the total height of the plurality of stacked ear thermometer probe covers 2.

During use, users can push out the ear thermometer probe covers 2 by pushing the sealing wall 31, such that the risk of pollution caused by direct contact between users and the ear thermometer probe covers 2 is effectively avoided; moreover, when the ear thermometer probe covers 2 are not used, the sealing wall 31 can seal the long slot 18 to isolate the stacked ear thermometer probe covers 2 from the external environment, such that the situation where dust or other pollutants in the air pollute the ear thermometer probe covers 2 through the long slot 18 is effectively avoided.

As a preferred embodiment of the invention, the sealing wall 31 and the top surface 32 are formed integrally, and the sealing wall 31 may be made of transparent plastic, such that users can observe the number of remaining ear thermometer probe covers 2 in the packing box 1 through the sealing wall 31; in addition, anti-slip lines 38 maybe disposed on an outer side of the sealing wall 31 and can effectively prevent slipping during use. In some embodiments, the sealing wall 31 may be detachably combined and connected with the top surface 32, and may be made of other transparent or semi-transparent materials.

The technical means disclosed by the solution of the invention are not limited to those disclosed in the above embodiments, and also include technical solutions formed by any combinations of the above technical features. It should be pointed out that those ordinarily skilled in the art can make some improvements and embellishments without departing from the principle of the invention, and all these improvements and embellishments fall within the protection scope of the invention.

What is claimed is:

1. A box-packed ear thermometer probe cover capable of preventing contact infection, comprising a packing box, a plurality of stacked ear thermometer probe covers, and a cover holder, wherein:

the packing box comprises a base, a vertical structure, a cavity and a cap, the vertical structure has an inner wall defining the cavity and an inner edge defining an opening of the cavity, the cap seals the opening, and a long slot is formed in the vertical structure;

each of the plurality of stacked ear thermometer probe covers comprises an upper platform and a container structure, wherein the container structure is suspended on the upper platform, and has an inner surface defining a container space and an inner circumferential edge defining an opening of the container space; the container structures of the ear thermometer probe covers located above stretch into the container spaces of the ear thermometer probe covers located below, such that the plurality of ear thermometer probe covers are stacked;

the cover holder comprises a sealing wall, a top surface and a suspension structure suspended on the top surface, wherein the top surface has an upper surface and an opening, the suspension structure has an inner border defining a size of the opening, and a suspension space, the sealing wall is connected to the top surface and extends in a direction opposite to the suspension structure, and when the cover holder is disposed in the cavity, the sealing wall seals the long slot;

wherein, the container structure of the lowest one of the plurality of stacked ear thermometer probe covers stretches into the suspension space.

2. The box-packed ear thermometer probe cover capable of preventing contact infection according to claim 1, wherein the upper platform of the ear thermometer probe cover further comprises an upper surface and a lower surface, and an annular protrusion is disposed on the upper surface.

3. The box-packed ear thermometer probe cover capable of preventing contact infection according to claim 2, wherein the lower surface of each of the plurality of ear thermometer probe covers is in contact with the annular protrusion of another one of the plurality of ear thermometer probe covers, such that the plurality of ear thermometer probe covers are stacked.

4. The box-packed ear thermometer probe cover capable of preventing contact infection according to claim 3, wherein a horizontal width of the container structure decreases gradually in a direction away from the upper platform.

5. The box-packed ear thermometer probe cover capable of preventing contact infection according to claim 4, wherein the inner border of the opening of the suspension structure is greater than the horizontal width of the container structure, and a depth of the suspension space is greater than a vertical height of the container structure.

6. The box-packed ear thermometer probe cover capable of preventing contact infection according to claim 5, wherein the lower surface of the lowest one of the plurality of stacked ear thermometer probe covers in contact with the upper surface of the cover holder.

7. The box-packed ear thermometer probe cover capable of preventing contact infection according to claim 6, wherein a width of the sealing wall is greater than that of the long slot, and a length of the sealing wall is greater than a total height of the plurality of stacked ear thermometer probe covers.

8. The box-packed ear thermometer probe cover capable of preventing contact infection according to claim 1, wherein the sealing wall is made of transparent plastic.

9. The box-packed ear thermometer probe cover capable of preventing contact infection according to claim 8, wherein anti-slip lines are disposed on an outer side of the sealing wall.

10. A ear thermometer probe cover dispenser, comprising a packing box, a plurality of thermometer probe covers, and a cover holder, wherein:
the packing box comprises a base, a vertical structure, a cavity and a cap, the vertical structure has an inner wall defining the cavity and an inner edge defining an opening of the cavity, the cap seals the opening of the cavity;
where an ear thermometer probe cover of the plurality of ear thermometer probe covers comprises an upper platform and a container structure, wherein the container structure is suspended from the upper platform, and the upper platform has an inner surface defining a container space and the container space has an opening marked by an inner circumferential edge;
where the container structure of the ear thermometer probe cover is located above a next ear thermometer probe cover of the plurality of ear thermometer probe covers, where the container structure of the ear thermometer probe cover stretches into the container spaces of the next ear thermometer probe cover, such that the plurality of ear thermometer probe covers are stacked;
the cover holder comprises a sealing wall, a top surface and a suspension structure suspended from the top surface, where the top surface has an upper surface and is perpendicular to the suspension sealing wall, and where the top surface has an opening, the suspension structure has an inner border defining a size of the opening, and a suspension space, the sealing wall is connected to the top surface and extends in a direction opposite to the suspension structure;
wherein, the plurality of ear thermometer probe covers has a lowest ear thermometer probe and the lower ear thermometer probe container structure stretches into the suspension space.

11. The ear thermometer probe cover dispenser according to claim 10, wherein a long slot is formed in the vertical structure, and when the cover holder is disposed in the cavity, the sealing wall seals the long slot.

12. The ear thermometer probe cover dispenser according to claim 10, wherein the container structure of the ear thermometer probe cover further comprises an upper surface and a lower surface, and an annular protrusion is disposed on the upper surface.

13. The ear thermometer probe cover dispenser according to claim 12, wherein the lower surface of each of the plurality of ear thermometer probe covers is in contact with the annular protrusion of another one of the plurality of ear thermometer probe covers, such that the plurality of ear thermometer probe covers are stacked.

14. The ear thermometer probe cover dispenser according to claim 13, wherein a horizontal width of the container structure decreases gradually in a direction away from the upper platform.

15. The ear thermometer probe cover dispenser according to claim 14, wherein the inner border of the opening of the suspension structure is greater than the horizontal width of the container structure, and a depth of the suspension space is greater than a vertical height of the container structure.

16. The ear thermometer probe cover dispenser according to claim 15, wherein the lower surface of the lowest one of the plurality of stacked ear thermometer probe covers is in contact with the upper surface of the cover holder.

17. The ear thermometer probe cover dispenser according to claim 16, wherein a width of the sealing wall is greater than that of the long slot, and a length of the sealing wall is greater than a total height of the plurality of stacked ear thermometer probe covers.

18. The ear thermometer probe cover dispenser according to claim 10, wherein the sealing wall is made of transparent plastic.

19. The ear thermometer probe cover dispenser according to claim 18, wherein anti-slip lines are disposed on an outer side of the sealing wall.

* * * * *